(12) United States Patent
Yura et al.

(10) Patent No.: US 7,573,162 B2
(45) Date of Patent: Aug. 11, 2009

(54) LINEAR MOTOR

(75) Inventors: Motozumi Yura, Aichi (JP); Yoichi Kawai, Aichi (JP)

(73) Assignee: Okuma Corporation, Niwa-Gun, Aichi (JP)

( * ) Notice: Subject to any disclaimer, the term of this patent is extended or adjusted under 35 U.S.C. 154(b) by 168 days.

(21) Appl. No.: 11/709,097

(22) Filed: Feb. 21, 2007

(65) Prior Publication Data

US 2007/0194632 A1    Aug. 23, 2007

(30) Foreign Application Priority Data

Feb. 21, 2006    (JP)    ............. 2006-044593

(51) Int. Cl.
*H02K 41/00*    (2006.01)

(52) U.S. Cl. ............. 310/12; 310/15; 310/13; 310/14

(58) Field of Classification Search ............. H20P 7/00
See application file for complete search history.

(56) References Cited

U.S. PATENT DOCUMENTS 6,025,659 A * 2/2000 Nashiki ............. 310/12

FOREIGN PATENT DOCUMENTS

| JP | HEI 8-251904 | | 9/1996 |
| JP | 9151048 | * | 6/1997 |
| JP | HEI 9-151048 | | 6/1997 |
| JP | HEI 11-089208 | | 3/1999 |
| JP | HEI 2005-137140 | | 5/2005 |

* cited by examiner

*Primary Examiner*—Quyen Leung
*Assistant Examiner*—Iraj A Mohandesi
(74) *Attorney, Agent, or Firm*—McCarter & English, LLP

(57) ABSTRACT

A linear motor having a more preferable braking function is realized with a low cost. A linear motor has a slider and a stator. A driving winding is wound around the slider. A plurality of permanent magnets forming magnetic poles which invert at a predetermined period are provided on a surface of the slider opposing the stator. Teeth are formed on the stator with a predetermined spacing therebetween. The stator extends to a region outside of an effective movable range, and a braking winding is wound around the teeth in the extended portion. When the slider moves into a region outside of the effective movable range, an induced voltage is generated in the braking winding and a current flows. A thrust in a direction opposite to the movement direction of the slider is generated by the current.

6 Claims, 4 Drawing Sheets

LINEAR MOTOR

PRIORITY INFORMATION

This application claims priority to Japanese Patent Application No. 2006-044593 filed on Feb. 21, 2006, which is incorporated herein by reference in its entirety.

BACKGROUND OF THE INVENTION

1. Field of the Invention

The present invention relates to a linear motor, and in particular to a control mechanism of a linear motor.

2. Description of the Related Art

In recent years, linear motors are more and more often used in various fields. For example, in a machine tool, linear motors are becoming increasingly popular for increasing feed rate in order to shorten machining time and for removing backlash and bending error due to a ball screw in order to improve machining precision. FIG. 3 shows an example structure of a portion of a machine tool which uses a linear motor. A bed 10 in FIG. 3 is a fixed portion of the tool and a stator 1 of a linear motor is fixed on the bed 10. A table 11 is mounted on the bed 10 via a linear guide or the like which is not shown, and is movable along the horizontal direction of FIG. 3. A slider 2 of the linear motor is fixed at a lower portion of the table 11 so that thrust is generated between the slider 2 and the stator 1, and the table 11 is driven. Normally, in a machining center, a machining object (or "workpiece") is placed on an upper surface of the table 11, and the movement position of the machining object is controlled according to a machining program or the like to machine the machining object into a predetermined shape using a tool, which is not shown.

In these machine tools which use linear motors, because the feed rate is high, a braking distance during emergency stopping of the feed in the case of control abnormality, for example, tends to be long. Because of this, when an abnormality occurs during high speed movement at a portion near a stroke end of the feed mechanism, there are cases in which accidents occur such that the movable portion collides with the fixed portion of the tool, and the tool structure is damaged.

In order to prevent such accidents, machine tools of related art which use liner motors are typically designed to weaken the impact due to the collision by providing a shock absorber 12 at a stroke end, as shown in FIG. 3. Examples of the shock absorbers 12 include a shock absorber using a fluid resistance of a hydraulic fluid sealed inside the shock absorber, and a shock absorber which uses elastic deformation of a resin material such as rubber.

There is another general method as shown in FIG. 4 in which a limit switch 13 is provided at the stroke end and the limit switch is mechanically activated when the movable portion moves over an effective movable range. When the limit switch is activated, a contact 14 blocks a current to be supplied to a driving winding using a circuit, and at the same time, a contact 15 short-circuits the driving winding so that a dynamic brake is activated and the slider 2 is braked and stopped. The contacts 14 and 15 are formed using relays and magnet conductors, and are controlled to be opened and closed by a coil 16 which is connected in series to the limit switch 13. An inverter 17 supplies a current to a driving winding which is built into the slider 2.

In addition, there also is a typical method in which a braking mechanism using friction is provided along with the linear motor. By activating the braking mechanism with a limit switch as described above, it is possible to automatically brake and stop the movable portion when the movable portion moves over the effective movable range.

These methods and devices in the related art are described in, for example, Japanese Patent Laid-Open Publication No. Hei 9-151048 and Japanese Patent Laid-Open Publication No. Hei 8-251904.

When a shock absorber is used in a machine tool which uses a linear motor in order to prevent collision of the movable portion of the tool with the fixed portion, a large shock absorber having a sufficient braking capability must be used, and thus the size of the tool structure becomes large. In addition, there also is a problem in an increase in the cost if the shock absorber itself.

In a method as shown in FIG. 4 in which the driving winding is short-circuited to activate a dynamic brake, the operation delay time of the relay or the like which is a part of the contact 15 may be problematic. Specifically, the braking force is not generated until the contact 15 is switched ON, and thus the movable portion continues to move by inertia. In addition, there are also problems with the reliability of the operation of the contacts 14 and 15. When the conductive portions of the contacts are worn due to long-term usage, sufficient braking force cannot be achieved.

Moreover, in a structure using a braking mechanism using friction, the friction of the braking mechanism may be problematic. That is, when a contact surface of the brake is worn because of long-term usage, sufficient braking force cannot be achieved.

An object of the present invention is to realize, as a structure for preventing collision of a movable portion with a stroke end in a linear motor due to control abnormality or the like, a braking function having a simple structure, low cost, and a high reliability in which a wearing portion such as a relay contact and brake pad is eliminated.

SUMMARY OF THE INVENTION

In order to achieve at least an object described above, according to one aspect of the present invention, there is provided a linear motor comprising a stator having a plurality of fixed-side teeth placed with a predetermined spacing therebetween, a slider having moving-side teeth around which a driving winding to which a drive current is supplied is wound, and a plurality of permanent magnets forming magnetic poles which invert at a period corresponding to the fixed-side teeth, and a braking mechanism which blocks driving of the slider entering a region outside of an effective movable range, wherein the braking mechanism is provided outside of the effective movable range, and comprises one or more braking teeth around which a braking winding is wound.

According to the linear motor of the present invention, a braking function is realized by providing braking teeth around which a braking winding is wound, outside the effective movable range. Because of this, a special braking device such as a shock absorber is not necessary, and thus the tool structure can be simplified and the size of the tool structure and the cost can be reduced.

Moreover, the linear motor according to the present invention has a structure in which only the braking teeth around which a braking winding is wound is additionally provided. Because no circuit such as a relay needs to be connected to the braking winding, a high reliability can be secured. In addition, because there is no free running period due to the activation delay time of the contact, the braking distance can be minimized.

Furthermore, in the linear motor of the present invention, because a braking force is generated by an electricity generating operation caused by passing the permanent magnet provided on the slider over the braking winding, there is no wearing portion, and reliable braking force can be maintained for a long period of time.

In addition, in the linear motor of the present invention, because the braking force can be varied by changing the circuit resistance of the braking winding, the braking force can be arbitrarily set according to the movement position of the slider. For example, by setting the resistance of the braking winding near the effective movable range to be high and the resistance of the braking winding to be smaller as the distance from the effective movable range is increased, it is possible to reduce the impact at the start of the braking, to thereby realize smooth braking and stopping.

BRIEF DESCRIPTION OF THE DRAWINGS

Preferred embodiments of the present invention will be described in detail by reference to the drawings, wherein.

DESCRIPTION OF THE PREFERRED EMBODIMENT

First Preferred Embodiment

Figure 1:
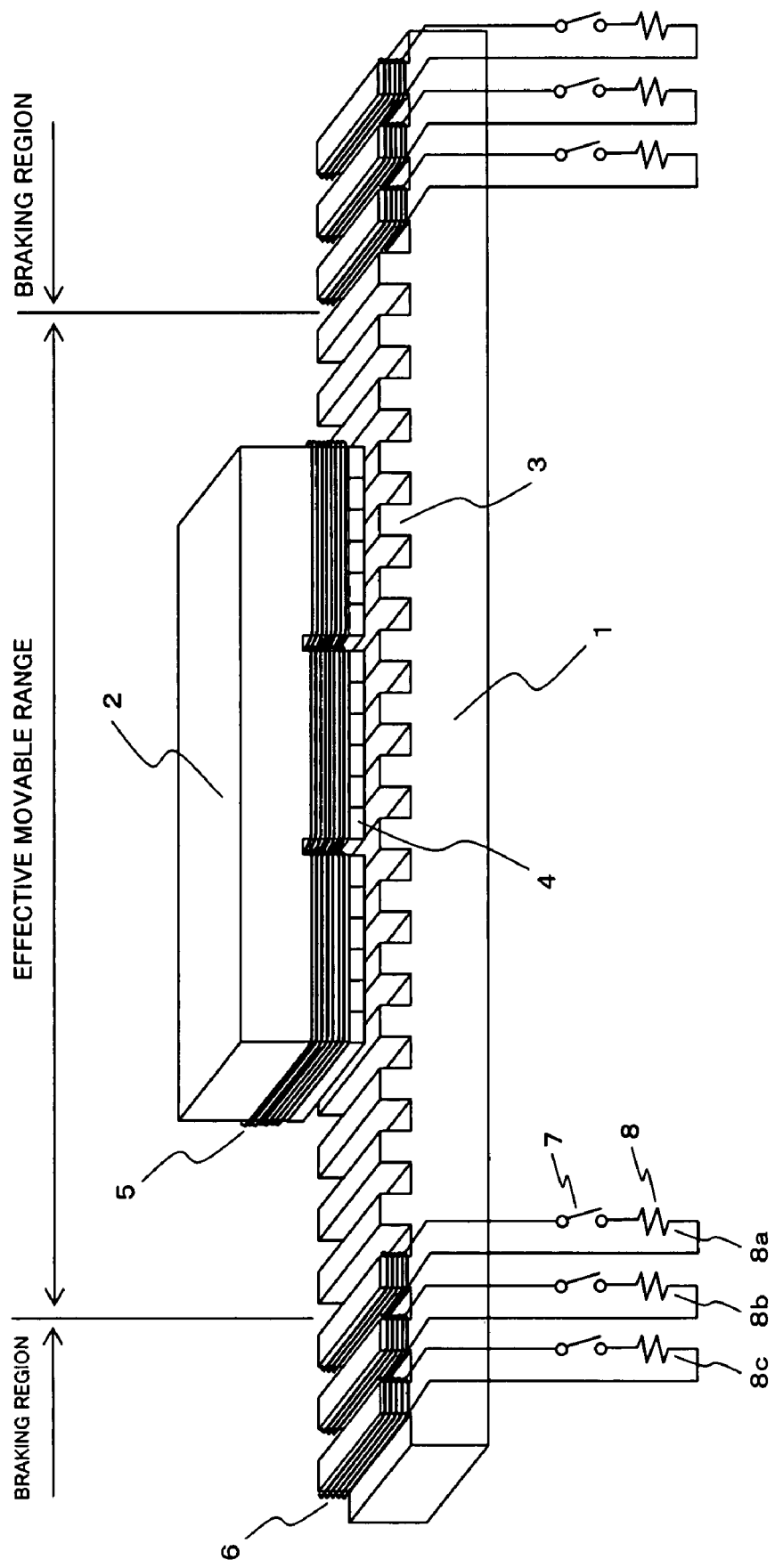
FIG. 1 is an outer view of a linear motor according to a first preferred embodiment of the present invention.

FIG. 1 is an outer view of a stator and a slider of a linear motor which is preferable for realizing the present invention. A stator 1 is constructed using a magnetic material such as a silicon steel sheet, and teeth 3 having projections and depressions are provided on a surface of the stator 1 opposing a slider 2. The slider 2 has a structure with a body constructed using a magnetic material such as a silicon steel sheet, and a permanent magnet 4 attached on a surface of the body opposing the stator 1. A three-phase driving winding 5 is wound around a plurality of magnets 4. A basic structure forming the basis of the linear motor of the present embodiment is identical to that of the linear motor described in Japanese Patent Laid-Open Publication No. 2005-137140 which is filed by the present applicants.

The ends of the stator 1 in FIG. 1 are braking regions and a braking winding 6 is wound around each of the teeth 3 in these regions. The plurality of braking windings 6 are connected to resistors 8 (8a, 8b, and 8c) via switches 7, and form circuits independent from each other. The contact of the switch 7 is normally closed, and is opened only when a brake is to be released, as will be described below. Alternatively, it is possible to replace the resistor 8 with the line resistance of the braking winding 6, and thus the resistor 8 may be omitted.

In FIG. 1, when the slider 2 is within an effective movable range, the current to be supplied to the driving winding 5 is controlled so that the thrust, speed, etc. of the linear motor are controlled. The braking region is a region which is not used in view of the control, and the slider 2 moves only within the effective movable range when the controller is normal. However, when an abnormality occurs in the controller, in particular, when a control abnormality occurs during a high speed movement at a portion within the effective movable range near the stroke end, the slider 2 will move into the braking region at a high speed due to inertia.

When the slider 2 moves into the braking region due to occurrence of such an abnormality, a magnetic flux is generated on the teeth in the braking region portion by the permanent magnet 4. The change in magnetic flux in turn causes an induced voltage to be generated in the braking winding 6, and current flows through the resistor 8. Because the current causes generation of a thrust in a direction opposite to the movement direction of the slider 2, the induced voltage acts as a dynamic brake. Because the current is determined by a relationship between the resistance value of the resistor 8 and the induced voltage, the braking force can be adjusted by varying the resistance values among the plurality of brake windings 6. For example, by setting the resistance value of the resistor 8a to be large, and sequentially reducing the resistance values for the resistors 8b and 8c in that order in FIG. 1, it is possible to configure the system to apply a weak braking force immediately after the slider 2 enters the braking region, that is, during start of braking, and apply a stronger braking force as the slider 2 moves farther apart from the effective movable range. By setting the braking force in this manner, a smooth braking force can be obtained, and the impact which is generated during braking and stopping of the slider 2 can be reduced.

Next, a function of the switch 7 will be described. When the machine is to be returned to the normal state after the slider 2 enters the braking region and stops and the cause of the control abnormality is removed, the switch 7 is opened so that no current flows through the braking winding 6. Here, no braking force is generated and the brake is released, and thus the slider 2 can be easily moved. In addition, at this point, it is also possible to supply current through the driving winding 5 to control and move the slider 2.

In the above-described embodiment, a linear motor having a structure in which a permanent magnet is attached on a surface of the slider is exemplified. The present invention, however, is not limited to such a configuration, and, for example, the same structure can be applied to realize similar effects and advantages in linear motors in which a permanent magnet is provided inside of a slider core as described in, for example, Japanese Patent Laid-Open Publication No. Hei 11-089298 filed by the present applicants.

Second Preferred Embodiment

Figure 2:
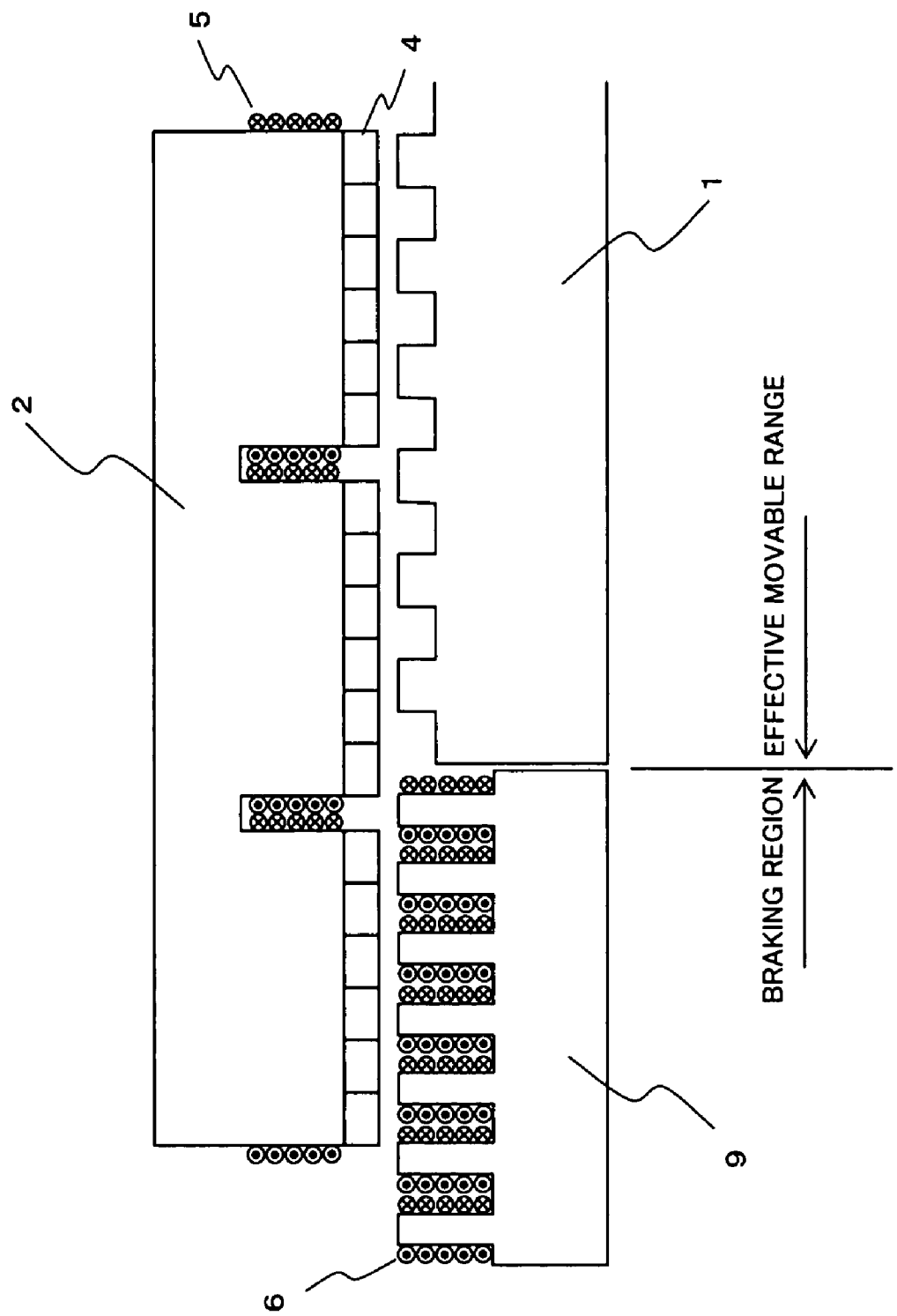
FIG. 2 is a cross sectional view of a linear motor according to a second preferred embodiment of the present invention.
Figure 3:
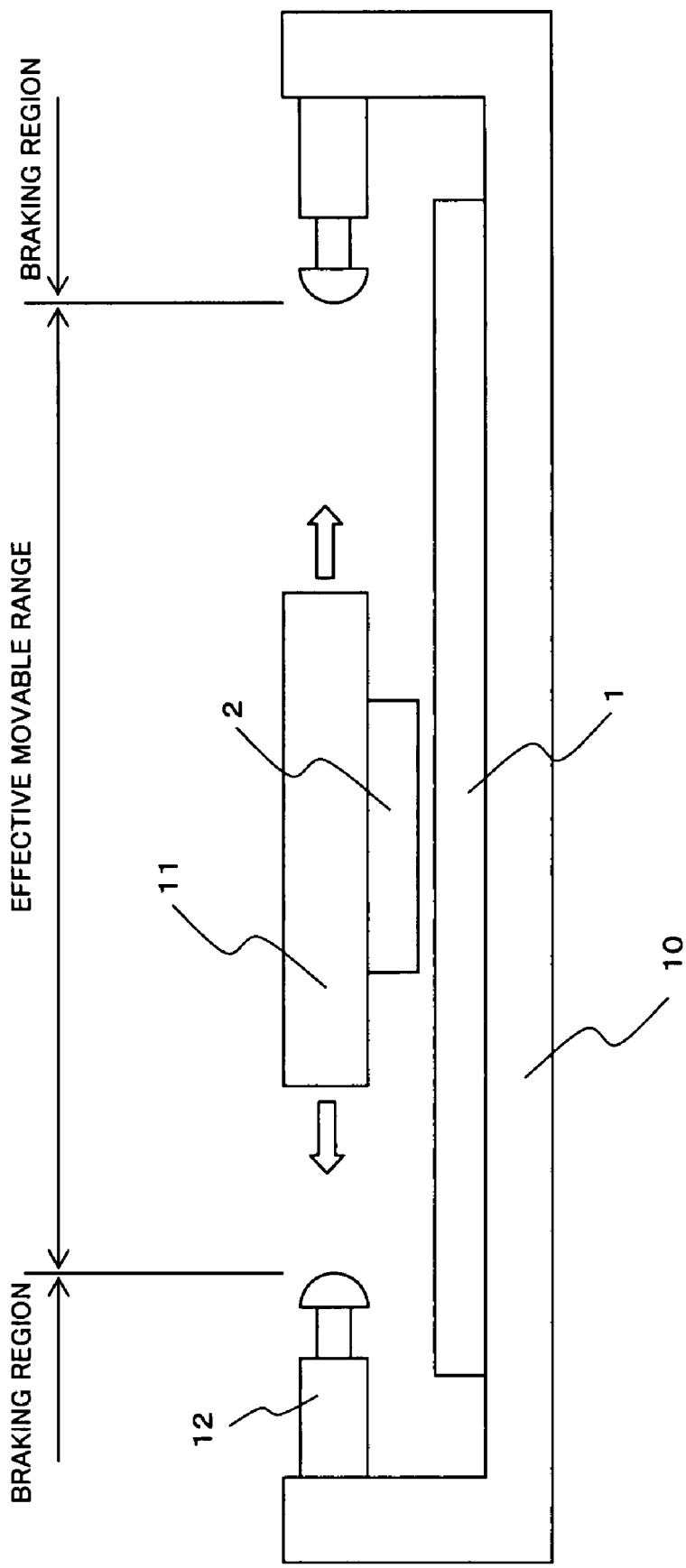
FIG. 3 is a structural diagram of a table portion of a machine tool which uses a linear motor according to related art.
Figure 4:
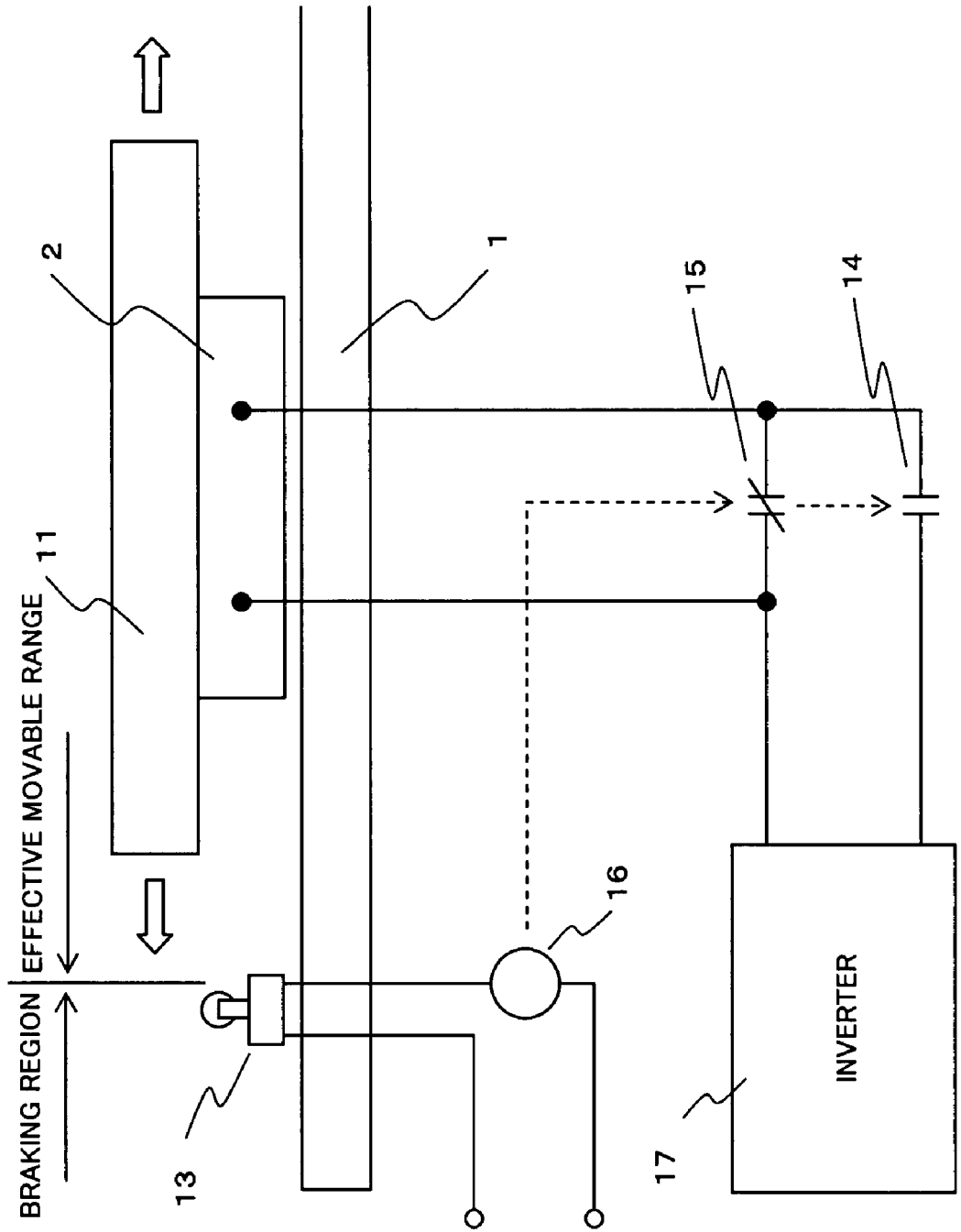
FIG. 4 is a diagram showing an example circuit when a dynamic brake is constructed using a relay in a linear motor according to related art.

FIG. 2 is a cross sectional view of a stator and a slider of a liner motor according to another preferred embodiment of the present invention. The stator 1 and the slider 2 are identical to those shown in FIG. 1 and will not be described again. In the second preferred embodiment, a braking stator 9 having a different shape to that in the effective movable range is placed in a braking region. By providing separate stators including the stator 1 in the effective movable range and the braking stator 9, it is possible to specifically shape the braking stator 9 optimally for generating the braking force. More specifically, in the preferred embodiment shown in FIG. 1, although there is an advantage that assembly is easy because the stator in the braking region and the stator in the effective movable range are shared, the shape of the stator in the braking region is not optimum for obtaining a braking force. The braking stator 9 in FIG. 2, on the other hand, can be designed in a specialized shape for braking, which has advantages such as, for example, that the packaging density of the braking winding 6 can be increased and a large braking force can be obtained.

What is claimed is:

1. A linear motor comprising:

a stator having a plurality of fixed-side teeth placed with a predetermined spacing therebetween;

a slider having moving-side teeth around which a driving winding to which a drive current is supplied is wound, and a plurality of permanent magnets forming magnetic poles which invert at a period corresponding to the fixed-side teeth; and a braking mechanism which blocks driving of the slider entering a region outside of an effective movable range, wherein the braking mechanism comprises one or more braking teeth around which a braking winding is wound, and the breaking teeth are provided outside of the effective movable range.

2. A linear motor according to claim 1, wherein the braking teeth are fixed-side teeth provided on an extension portion of the stator extending outside of the effective movable range.

3. A linear motor according to claim 1, wherein the braking teeth are teeth dedicated to braking and provided separately from the fixed-side stator.

4. A linear motor according to claim 1, wherein a resistor is connected to at least one of the braking windings.

5. A linear motor according to claim 1, wherein circuit resistances of closed circuits formed by the braking windings differ from each other according to positions of the braking teeth around which the braking windings are wound.

6. A linear motor according to claim 1, wherein a switch which opens a closed circuit formed by the braking winding is provided in the braking winding, for releasing a braking force.

* * * * *